Aug. 31, 1926.
A. J. STENCELL
1,598,024
SPRING CONTROLLED SHOCK ABSORBER
Filed Oct. 20, 1924
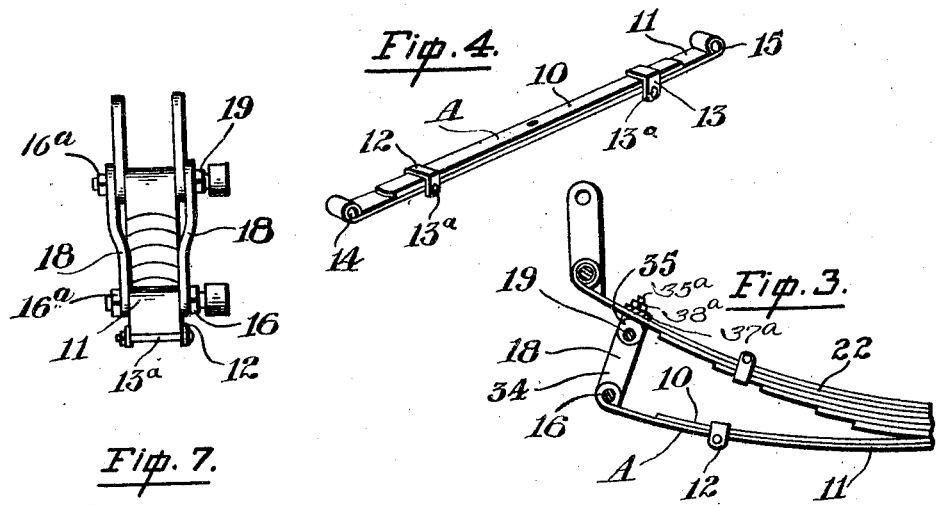
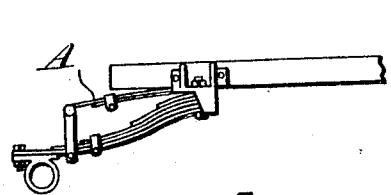
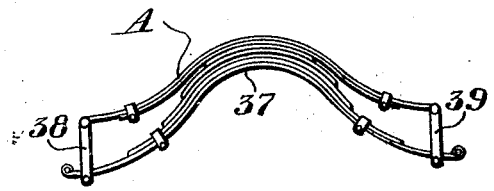
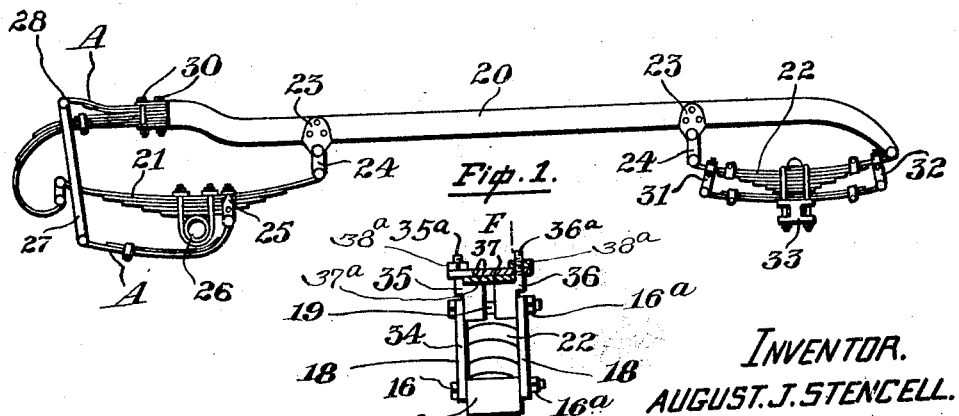
INVENTOR.
AUGUST. J. STENCELL.
BY Featherstonhaugh & Co.
ATT'YS.

Patented Aug. 31, 1926.

1,598,024

UNITED STATES PATENT OFFICE.

AUGUST JOHN STENCELL, OF PERTH, ONTARIO, CANADA.

SPRING-CONTROLLED SHOCK ABSORBER.

Application filed October 20, 1924, Serial No. 744,846, and in Canada October 15, 1924.

This invention relates to improvements in spring-controlled shock absorbers, and the objects of the invention are to provide a simply constructed, durable and efficient device of this character adapted to be used in combination with different forms of automobile and other vehicle springs.

Further objects are to provide a device of this character the several parts of which are so constructed and improved upon that they will more efficiently perform the various functions required of them and whereby travel in a vehicle is rendered more comfortable, even over roads with uneven surfaces.

With the foregoing and other objects in view, the invention consists essentially in the combination with a main spring and means connecting the spring to the vehicle axle, of a supplemental leaf spring formed with means thereon adapted to connect with the main spring and with the vehicle frame.

Referring now to the drawings, in which like characters of reference indicate corresponding parts in each figure:

Figure 1 is a side elevation showing my improved device attached to the front and rear springs of a Dodge motor car.

Figure 2 is an end view of my improved clip and link connecting member.

Figure 3 is a section on line F—F of Figure 2.

Figure 4 is a perspective view of the shock-absorbing or supplemental spring.

Figure 5 is a side view showing the shock-absorbing spring attached to the spring of a Chevrolet car.

Figure 6 is a rear end view of the shock-absorbing spring attached to the spring of a Ford car.

Figure 7 is an alternative form of clip.

Referring now more particularly to the drawings, A designates the shock-absorbing spring as a whole and as more particularly illustrated in Figure 4, comprising a pair of spring steel leaves 10 and 11 held together by clips 12 and 13 with bolts 13ª therebetween, one of said springs, 11, being longer than the other and rolled at the ends 14 and 15 to form eyes adapted to engage with pins 16 whereby, as illustrated in Figure 3, the spring A is connected to a link 18 also adapted by means of a pin 19 to connect with the ordinary spring of a vehicle. The pins 16 and 19 are provided with retaining nuts 16ª whereby the links 18, carried by said pins, may be adjusted.

My shock-absorbing spring is preferably, as illustrated in Figure 4, composed of two leaves only and is adapted to fit the various kinds of springs used in the different makes of automobiles and the like.

To more securely and satisfactorily attach my shock-absorbing spring, two leaves are removed from the ordinary spring of an automobile to allow for the introduction of the shock-absorbing spring.

Referring now to Figure 1, in which my shock-absorbing spring is shown as fitted to the spring of a Dodge car, 20 designates the chassis frame, and 21 and 22 the rear and forward leaf springs respectively, both of which are connected through shackles 23 and links 24 with the chassis frame 20. The supplemental spring constituting my invention is fitted to the rear spring 21 by means of a clip 25 adapted to embrace said spring and to be connected in the ordinary way with the eyes in the end thereof by means of a pin. The shock absorber A is suitably bent beneath the axle supporting member 26 on the spring 21, and is connected at its other end to the lower end of a link 27, the upper end of this link being connected at 28 to another of my supplemental springs in turn secured over the vehicle spring on the chassis frame 20 by means of bolts 30.

Beneath the front spring 22 one of my supplemental shock-absorbing springs is fitted, being connected at each end to the main spring by means of my combined link and clip members 31 and 32, the shock-absorbing spring being arranged beneath the main spring as above described and above the axle 33, the main spring being connected in the usual manner through a link 24 to a shackle 23 on the frame 20 at one end and directly connected to the frame at the other end.

The combined link and clip member as illustrated in Figure 2, and an alternative form of which is illustrated in Figure 7, consists essentially of a link 34 adapted to engage at one end with the ends 14 and 15 of the supplemental shock-absorbing spring and connected at the other end to a clip member formed in two pieces 35 and 36 mounted on the bolt 19 and secured by the nut 16ª. Formed integrally with the members 35 and 36 are screwthreaded shanks 35ª and 36ª adapted to be secured to the main spring by means of a perforated plate 37 and the retaining nuts 38ª. It will thus be seen that the position of the supplemental shock-absorbing spring may be adjusted on the main spring by simply loosening the nuts 38$^a$ and 16$^a$ and tightening the same when the desired position has been obtained. The members 35 and 36 may be closed or drawn apart in order to fit the different widths of leaves of springs.

In Figure 5 my shock-absorbing spring is shown in combination with the spring of a Chevrolet car, while in Figure 6 it is shown in combination with the spring of a Ford car, and is arranged over the arched main spring 37 conforming to the contour thereof and operatively connected thereto at each end by links 38 and 39.

From the foregoing it will be noted that the essential feature of my shock-absorbing spring is that when in position it is always sprung or tensioned, being bent to provide the maximum shock-absorbing results.

As many changes could be made in the above construction, and many apparently widely different embodiments of my invention, within the scope of the claim, constructed without departing from the spirit or scope thereof, it is intended that all matter contained in the accompanying specification and drawings, shall be interpreted as illustrative and not in a limiting sense.

What I claim as my invention is:

In a device of the character described, a main spring, an auxiliary shock-absorbing spring formed of two leaves of unequal length rigidly strapped together and having the ends of the longer leaf suitably bent, a combined link and clip member designed to pivotally engage with the bent ends of the auxiliary spring leaf and to adjustably engage with the main spring, and means for adjusting said member.

In witness whereof I have hereunto set my hand.

AUGUST JOHN STENCELL.